United States Patent
Kiemlen et al.

(10) Patent No.: US 9,427,682 B2
(45) Date of Patent: Aug. 30, 2016

(54) LIQUID FILTER, IN PARTICULAR AN OIL FILTER

(75) Inventors: Ralf Kiemlen, Reutlingen (DE); Engin Genc, Waiblingen (DE)

(73) Assignee: Mahle International GmbH (DE)

(*) Notice: Subject to any disclaimer, the term of this patent is extended or adjusted under 35 U.S.C. 154(b) by 903 days.

(21) Appl. No.: 13/588,640

(22) Filed: Aug. 17, 2012

(65) Prior Publication Data

US 2013/0043173 A1    Feb. 21, 2013

(30) Foreign Application Priority Data

Aug. 18, 2011 (DE) .................... 20 2011 104 686 U

(51) Int. Cl.
| | |
|---|---|
| *B01D 35/16* | (2006.01) |
| *B01D 29/21* | (2006.01) |
| *B01D 29/96* | (2006.01) |
| *B01D 35/153* | (2006.01) |
| *F01M 11/03* | (2006.01) |
| *F01M 1/10* | (2006.01) |

(52) U.S. Cl.
CPC .............. *B01D 29/21* (2013.01); *B01D 29/96* (2013.01); *B01D 35/153* (2013.01); *B01D 35/16* (2013.01); *F01M 11/03* (2013.01); *B01D 2201/291* (2013.01); *B01D 2201/4007* (2013.01); *F01M 2001/1064* (2013.01)

(58) Field of Classification Search
CPC .... B01D 29/21; B01D 29/96; B01D 35/153; B01D 35/16; B01D 2201/291; B01D 2201/4007; B01D 35/306; B01D 35/30; B01D 2201/302; B01D 35/1573; F01M 11/03; F01M 2001/1064
See application file for complete search history.

(56) References Cited

U.S. PATENT DOCUMENTS

| | | | | |
|---|---|---|---|---|
| 5,269,913 | A | * | 12/1993 | Atkins .......................... 210/136 |
| 6,706,181 | B1 | * | 3/2004 | Baumann ............... B01D 29/21 |
| | | | | 210/236 |
| 2004/0094464 | A1 | | 5/2004 | Baumann et al. |
| 2008/0202081 | A1 | | 8/2008 | Schmid et al. |

(Continued)

FOREIGN PATENT DOCUMENTS

| | | |
|---|---|---|
| DE | 102006028148 A1 | 12/2007 |
| DE | 102007009352 A1 | 8/2008 |

(Continued)

OTHER PUBLICATIONS

English abstract provided for EP-2353692, Aug. 2011.

(Continued)

*Primary Examiner* — Thomas M Lithgow
(74) *Attorney, Agent, or Firm* — Fishman Stewart PLLC

(57) ABSTRACT

The invention relates to a liquid filter, having a filter housing, which contains a receiving space for a ring filter element. The liquid filter further has a no-load duct, which is opened when the ring filter element is taken out. A pin is formed on a lower end disc of the ring filter element, the pin projects parallel to the longitudinal axis. A ramp is formed on the bottom of the receiving space. The ramp is matched to the pin in such a manner that, when the ring filter element is inserted into the filter housing, the pin slides downwards on the ramp and penetrates the opening of the no-load duct. A structure is in the receiving space, the structure allows functional insertion of the ring filter element if the ring filter element slides with its pin along the ramp until the pin penetrates the opening of the no-load duct.

11 Claims, 2 Drawing Sheets

(56) References Cited

U.S. PATENT DOCUMENTS

| | | |
|---|---|---|
| 2009/0230048 A1 | 9/2009 | Braunheim |
| 2012/0168365 A1 | 7/2012 | Stifel et al. |
| 2012/0234743 A1 | 9/2012 | Braunheim et al. |
| 2012/0267293 A1 | 10/2012 | Ardes |

FOREIGN PATENT DOCUMENTS

| | | |
|---|---|---|
| DE | 102009030503 A1 | 12/2010 |
| DE | 102009041523 A1 | 3/2011 |
| DE | 102009054523 A1 | 6/2011 |
| EP | 1229985 A1 | 8/2002 |
| EP | 2168651 A1 | 3/2010 |
| EP | 2353692 A2 | 8/2011 |

OTHER PUBLICATIONS

English abstract provided for EP-2168651, Mar. 2010.
German Search Report for DE-12179258.4, Nov. 2012.

\* cited by examiner

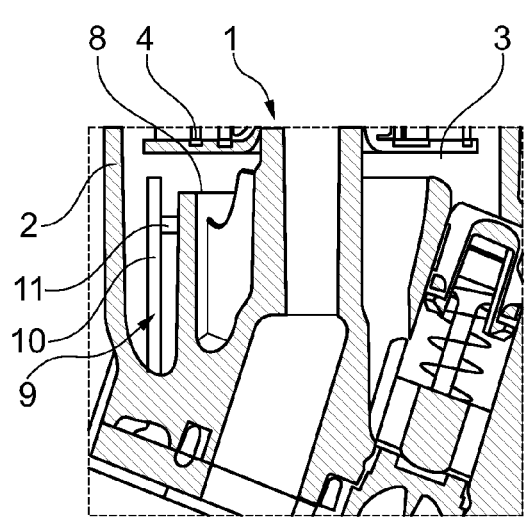
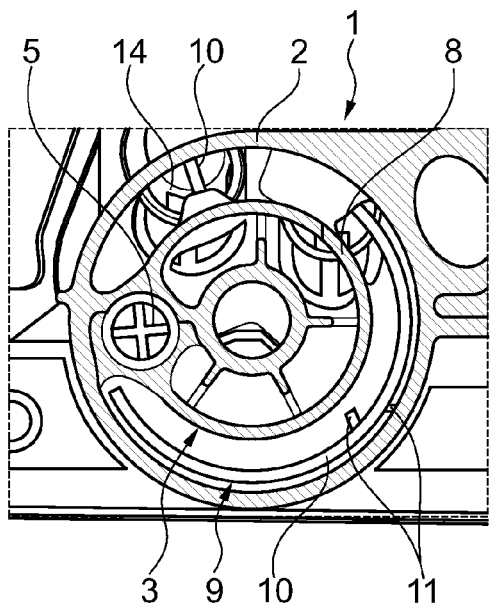
Fig. 1              Fig. 2
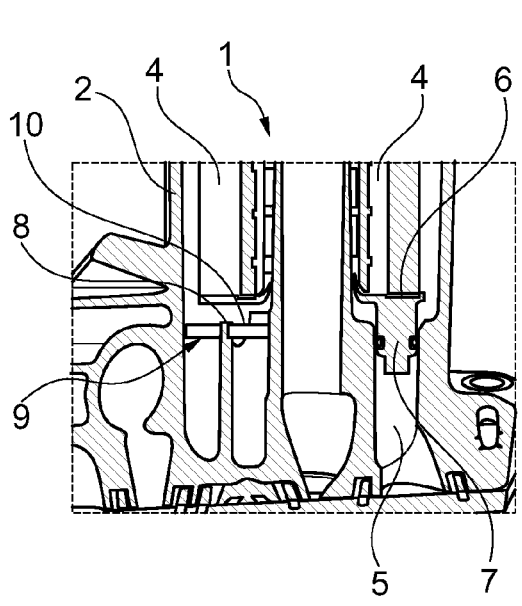
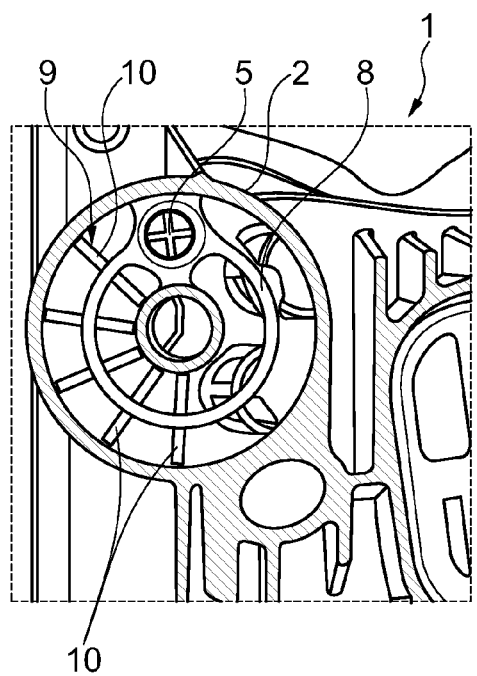
Fig. 3              Fig. 4

LIQUID FILTER, IN PARTICULAR AN OIL FILTER

CROSS-REFERENCE TO RELATED APPLICATION

This application claims priority to German patent application DE 10 2011 104 686.2 filed on Aug. 18, 2011, which is hereby incorporated by reference in its entirety.

TECHNICAL FIELD

The invention relates to a liquid filter, in particular an oil filter for purifying lubricating oil, in particular for internal combustion engines of motor vehicles, having the features of the preamble of Claim 1. The invention also relates to a ring filter element for such a liquid filter.

BACKGROUND

EP 1 229 985 B1 discloses a generic liquid filter having a filter housing which is arranged essentially vertical when in the installed state and which contains a receiving space for a ring filter element inserted therein for filtering a liquid. The ring filter element is matched to the filter housing in such a manner that it can be freely rotated about its longitudinal axis in the receiving space as long as a pin projecting axially and eccentrically from the lower end disc of the ring filter element does not engage in an opening of a no-load duct. A ramp is formed on the bottom of the receiving space, which ramp starts on the bottom with a lower end at the opening of the no-load duct and rises with increasing ramp length into the interior of the receiving space. When the ring filter element is inserted into the filter housing, the pin lies on the ramp and slides down along it when the ring filter element is rotated, penetrating the opening of the no-load duct at the lower end of the ramp. This embodiment requires the use of a very specific ring filter element, namely one having a pin of this type, because if conventional ring filter elements without the pin are used there would be a short circuit connection between the no-load duct and the inlet or outlet and therefore there would no longer be any functionality.

SUMMARY

The present invention is concerned with the problem of specifying an improved or alternative embodiment for a liquid filter of the generic type, which in particular has increased robustness and improved installation safety for a ring filter element.

This problem is solved according to the invention by the subject matter of the independent claims. Advantageous embodiments form the subject matter of the dependent claims.

The present invention is based on the general concept of providing a liquid filter, in particular an oil filter for purifying lubricating oil, in particular for internal combustion engines of motor vehicles, with structures which prevent incorrect installation of a ring filter element and thus ensure the high filter output necessary for trouble-free and long operation and which additionally reinforce the filter housing. This problem is solved by a special key/lock principle, the ring filter element forming the key and a filter housing or a functional carrier arranged in the latter forming the associated lock, and by additional structures which are arranged in the receiving space of a filter housing and give the liquid filter according to the invention increased robustness and at the same time prevent incorrect installation of the ring filter element or the installation of an unsuitable filter element. The filter housing is arranged essentially vertically when in the installed state and contains a receiving space for the ring filter element inserted therein for filtering the liquid. The liquid filter also has an inlet for raw liquid and an outlet for cleaned liquid and a no-load duct, which is opened by taking out the ring filter element. To do this, a pin is integrally formed on a lower end disc of the ring filter element, which pin projects parallel to the longitudinal axis and eccentrically, and penetrates an opening of the no-load duct in a sealing manner when the ring filter element is inserted into the filter housing. A ramp is also provided on the bottom of the receiving space, which ramp starts on the bottom with a lower end at the opening of the no-load duct and rises with increasing ramp length into the interior of the receiving space, the ramp and the pin being matched to each other in such a manner that when the ring filter element is inserted into the filter housing the pin—as long as it has not yet penetrated the opening of the no-load duct—lies on the ramp and slides down along the ramp when the ring filter element is rotated and penetrates the opening of the no-load duct at the lower end of the ramp and thereby closes the opening. According to the invention, at least one structure is arranged in the receiving space, in particular adjacently to the ramp on the bottom of the receiving space, which structure is formed in such a manner that it reinforces the filter housing and only allows functional insertion of the ring filter element if the filter element is placed with its pin on the ramp and slides along the latter until the pin penetrates the opening of the no-load duct at the lower end of the ramp. Such a structure increases the robustness with marginal extra outlay, as a result of which the consumer receives a much improved liquid filter. At the same time, the benefit to the customer is increased in that incorrect installation of the ring filter element is virtually impossible, and at the same time the installation of unsuitable ring filter elements is prevented.

In an advantageous development of the solution according to the invention, the structure is formed as a rib. Such a rib can extend for example essentially parallel to the ramp, or it is also conceivable for a plurality of ribs to be provided, which extend in the radial direction of the filter housing and which are for example injection-moulded in a common injection-moulding process together with the filter housing or the functional carrier. Such ribs can be produced in a cost-effective manner and in virtually any shape, so the great additional benefit for the customer, namely the increase in quality, can be ensured in a comparatively cost-effective manner by the invention. Such ribs also prevent incorrect installation of the ring filter element, as they only allow functional insertion of the ring filter element if it is placed as intended with its pin on the ramp and slides along the latter until the pin penetrates the opening of the no-load duct. If the pin inadvertently slips off the ramp, the ring filter element is prevented from further rotation and thus pre-defined introduction of the pin into the no-load duct by the radially extending ribs.

In an advantageous development of the solution according to the invention, the structure and the ramp are arranged on the filter housing or on a functional carrier which is inserted into the filter housing. This should show that the ramp according to the invention and the structure according to the invention do not necessarily have to be arranged directly on the filter housing but for example also on an insertion part, namely the functional carrier, which is then installed in the filter housing.

In an advantageous development of the solution according to the invention, the structure has ribs which extend in particular in the radial direction of the filter housing and thus orthogonally to the ramp. This reduces the circumferential spacing of the ribs extending in the radial direction in the downward direction of the ramp. Such radially aligned ribs make it possible for the ramp itself to be reinforced, namely with respect to a vertical tube in the centre and with respect to inner walls of the filter housing, as a result of which the filter housing has a much increased rigidity in particular in this bottom region. In addition, such ribs can be used to prevent unintentional slipping of the pin of the ring filter element from the ramp, because if such a slippage happens, the ring filter element is prevented from rotating further owing to the ribs running transversely to the direction of rotation. The ribs themselves can be injection-moulded onto the filter housing or onto a functional carrier and in this form can be produced in a cost-effective manner together with the latter in a single work step.

Further important features and advantages of the device according to the invention can be found in the subclaims, the drawings and the associated description of the figures using the drawings.

It is self-evident that the features which are mentioned above and those which are still to be explained below can be used not only in the combination specified in each case, but also in other combinations or alone without departing from the scope of the present invention.

BRIEF DESCRIPTION OF THE DRAWINGS

Preferred exemplary embodiments of the invention are shown in the drawings and explained in more detail in the description below.

In the figures,

FIG. 1 schematically shows a longitudinal section through a liquid filter in a bottom region with a structure according to the invention, FIG. 2 schematically shows a cross section through the liquid filter according to FIG. 1 in the region of the structure, FIG. 3 schematically shows an illustration as in FIG. 1, but with a differently formed structure, FIG. 4 schematically shows an illustration as in FIG. 2, but with the structure shown in FIG. 3, FIG. 5 schematically shows a further embodiment of the structure according to the invention, FIG. 6 schematically shows an illustration as in FIG. 5, but with an inserted ring filter element.

DETAILED DESCRIPTION

Figure 5:
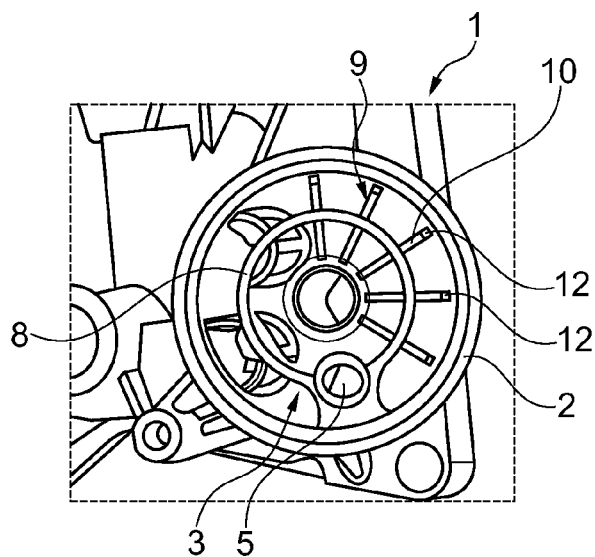

According to FIG. 1-6, a liquid filter 1 according to the invention, which is formed in particular as an oil filter for purifying lubricating oil, in particular for internal combustion engines in motor vehicles, has a filter housing 2 having a receiving space 3, in which a ring filter element 4 (cf. FIGS. 6 and 7) is used to filter a liquid. Of course, the liquid filter 1 also has an inlet for the raw liquid and an outlet for the cleaned liquid in a known manner, as well as a no-load duct 5, which is opened when the ring filter element 4 is taken out (cf. FIGS. 2 and 3), a pin 7 being integrally formed on a lower end disc 6 of the ring filter element 4, which pin projects parallel to the longitudinal axis and eccentrically (cf. FIG. 3), and which penetrates an opening of the no-load duct 5 in a sealing manner when the ring filter element 4 is inserted into the filter housing 2. A ramp 8 is also formed on the bottom of the receiving space 3, which ramp starts with a lower end at the opening of the no-load duct 5 and rises with increasing ramp length into the interior of the receiving space 3. The ramp 8 and the pin 7 are matched to each other in such a manner that when the ring filter element 4 is inserted into the filter housing 2 the pin 7—as long as it has not yet penetrated the opening of the no-load duct 5—lies on the ramp 8 and slides downwards when the ring filter element 4 is rotated about its longitudinal axis and penetrates the opening of the no-load duct 5 at the lower end of the ramp 8. It is essential to the invention that at least one structure 9 is arranged in the receiving space 3, in particular adjacently to the ramp 8 on the bottom of the receiving space 3, which structure only allows functional insertion of the ring filter element 4 if the latter is placed with its pin 7 on the ramp 8 and slides along the latter until the pin 7 penetrates the opening of the no-load duct 5 at the lower end of the ramp 8. The at least one structure 9 is used in particular to increase quality and can have a wide variety of shapes, as is shown for example in FIGS. 2 and 4. The structure 9 and the ramp 8 can be arranged either on the filter housing 2 itself or on a functional carrier (not shown) which can be inserted in the latter. The structure 9 can project upwards from the ramp 8, as is shown for example in FIG. 1, or be formed lower than the ramp, as is shown for example in FIG. 3. Of course, it is conceivable for the structure 9 and the ramp 8 to be of equal height. If the structure 9 is higher than the ramp 9, the latter can also form a lateral guide for the pin 7 of the ring filter element 4 which slides along the ramp 8.

The structure 9 can generally have ribs 10 which extend essentially parallel to the ramp 8, as is shown for example in FIGS. 1 and 2, or else ribs 10 which run in the radial direction of the filter housing 2 and orthogonally to the ramp 8, as is shown for example in FIG. 3-5. Ribs 10 or structures 9 arranged in this manner in particular reinforce the ramp 8 with respect to the filter housing 2 and make the filter housing 2 overall much more rigid in the bottom region. The ribs 10 shown in FIGS. 3 and 4 can also be used to prevent incorrect installation of the ring filter element 4, as the ring filter element 4 is prevented from further rotating by the ribs 10 if its pin 7 inadvertently slips off the ramp 8. High-quality assembly and positionally exact installation of the ring filter element 4 in the filter housing 2 can be achieved by means of the structures 9. According to FIG. 4, the individual ribs 10 of the structure 9 have a virtually uniform spacing in the circumferential direction, it also being possible for the circumferential spacing to be reduced in the downward direction of the ramp 8. This in particular improves reinforcement of the ramp 8 in the region of the no-load duct 5. The ribs 10 which are arranged on both sides of the ramp 8 and extend in the radial direction of the filter housing 2 can also project upwards beyond the ramp 8, it then having to have a recess which is big enough for the pin 7 to pass through it, and the two ribs 10 then form a passage for the pin 7.

Looking at the structure 9 in FIGS. 1 and 2 again, it can be seen that the structure 9 formed there has an arc-shaped rib 10, which extends for more than 180° parallel to the ramp 8. The rib shape shown in FIGS. 1 and 2 is the simplest, ribs 10 with additional branches 11 of course also being conceivable. It is likewise conceivable for individual openings 14 (cf. FIG. 2) in the filter housing 2 or in an associated functional carrier to be crossed by a rib 10 and reinforced thereby. It must of course be ensured in all the embodiments of the structures 9 or ribs 10 shown that the permeability to liquid necessary for functioning of the liquid filter 1 can be reliably provided.

Figure 6:
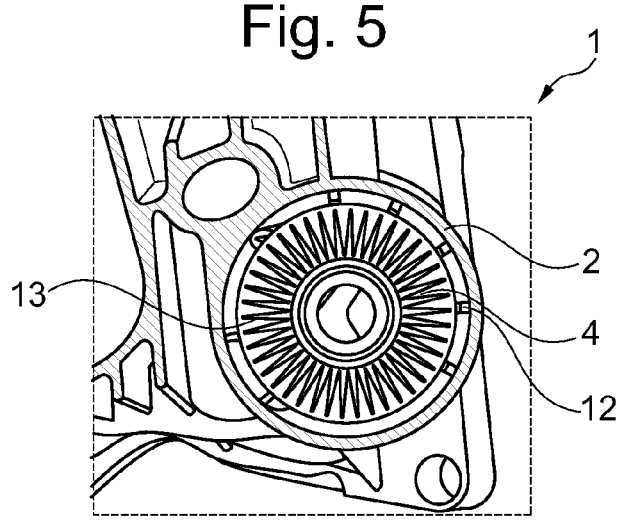
Figure 7:
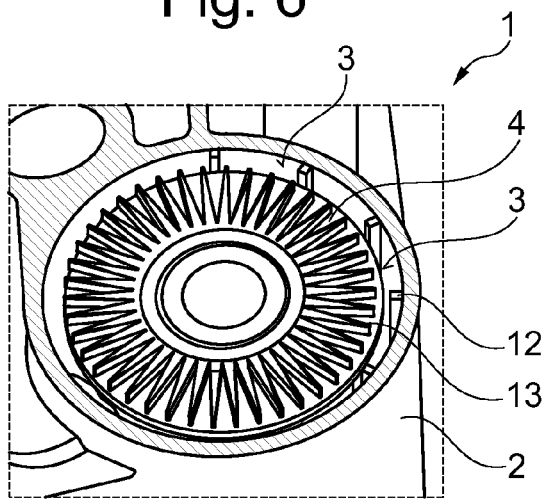
FIG. 7 shows an oblique view of FIG. 6.

Looking at the diagrams of the liquid filter 1 in FIG. 5-7, it can be seen that positioning ribs 12 are provided, which are arranged on inner walls of the filter housing 2, extend in the axial direction and, when a ring filter element 4 is inserted, bear against the latter or against a lower end disc 6 or an upper end disc 13. The positioning ribs 12 can be formed integrally with the ribs 10 of the structure 9 running on the bottom. The provision of the positioning ribs 12 makes is possible for the ring filter element 4 to be arranged in a preferably play-free manner in the filter housing 2, as a result of which it can be held precisely in the filter housing 2. The positioning ribs 12 can form an integral component of the structure 9 and in particular be in one piece with it. The structure 9 can of course also have only such positioning ribs 12 without additional ribs 10. The positioning ribs 12 also reinforce the filter housing 2.

The filter housing 2, like the ring filter element 4, is usually arranged essentially vertically, a vertical arrangement also meaning deviations from the perpendicular of up to 40°.

With the at least one structure 9 arranged on the bottom of the receiving space 3, not only the rigidity in the bottom region of the filter housing 2 can be increased, but also the risk of incorrect installation or the risk of jamming of the ring filter element 4 during installation can be reduced. The unintentional installation of unsuitable filter elements can also be prevented, the customer can be protected from damage which can occur as a result of the installation of unsuitable filter elements. The embodiments of the structures 9 or the associated ribs 10 shown should of course be understood as being mere examples, so other structures 9 which differ in shape and/or size from the structures 9 shown but fulfill the same purpose are also included in the invention.

The invention claimed is:

1. An oil filter for purifying lubricating oil for an internal combustion engine of a motor vehicle, comprising:
 a filter housing having a receiving space and a ring filter element having a longitudinal axis arranged in the receiving space of the filter housing for filtering a liquid,
 the filter housing including an inlet for raw liquid and an outlet for cleaned liquid,
 a no-load duct, which is opened when the ring filter element is taken out, a pin being integrally formed on a lower end disc of the ring filter element, which pin projects parallel to the longitudinal axis and eccentrically, and which penetrates an opening of the no-load duct in a sealing manner when the ring filter element is inserted into the filter housing,
 a ramp disposed on a bottom of the receiving space, wherein the ramp extends circumferentially about the longitudinal axis from the bottom with a lower end at the opening of the no-load duct and rises axially with increasing ramp length into the interior of the receiving space,
 wherein the ramp and the pin are matched to each other in such a manner that when the ring filter element is inserted into the filter housing the pin as long as it has not yet penetrated the opening of the no-load duct engages on the ramp and slides towards the bottom when the ring filter element is rotated about the longitudinal axis and penetrates the opening of the no-load duct at the lower end of the ramp, and
 at least one structure arranged adjacent to the ramp in the receiving space, the at least one structure preventing insertion of the ring filter element into the receiving space unless the pin of the ring filter element engages and slides along the ramp until the pin penetrates the opening of the no-load duct at the lower end of the ramp,
 wherein the at least one structure includes at least one rib, and wherein the at least one rib extends in a radial direction transversely to the ramp with respect to the longitudinal axis, and
 wherein the at least one structure further includes a plurality of positioning ribs, wherein the plurality of positioning ribs are arranged on an inner wall of the filter housing facing the ring filter element and extend in an axial direction and bear against the ring filter element when the ring filter element is arranged in the receiving space of the filter housing.

2. The filter according to claim 1, wherein the at least one of the structure and the ramp are arranged on the filter housing or on a functional carrier which is inserted in the filter housing.

3. The filter according to claim 1, wherein the at least one structure projects beyond the ramp or is disposed lower than the ramp with respect to the bottom.

4. The filter according to claim 1, wherein the at least one rib extends in the radial direction transversely to the ramp and wherein the at least one rib is disposed at least on a radial outside of the ramp with respect to the longitudinal axis.

5. The filter according to claim 4, wherein the at least one rib further includes a plurality of radially extending ribs, and wherein a circumferential spacing of the ribs is reduced in a direction towards the lower end of the ramp.

6. The filter according to claim 1, wherein the plurality of positioning ribs form an integral component of the structure.

7. The filter according to claim 1, wherein the at least one rib includes a plurality of ribs extending in the radial direction transversely to the ramp, wherein the plurality of ribs are disposed on both radial sides of the ramp with respect to the longitudinal axis, the plurality of ribs configured to prevent rotation of the ring filter element about the longitudinal axis when the pin slips off the ramp.

8. A liquid filter for an internal combustion engine, comprising:
 a filter housing defining a receiving space having a receiving space bottom and including an inlet for raw liquid and an outlet for cleaned liquid;
 a ring filter element received by the receiving space and having a longitudinal axis, the ring filter element including an axially projecting pin disposed on an axial end and arranged eccentrically with respect to the longitudinal axis;
 a no-load duct disposed at the receiving space bottom and having an opening configured to receive the pin when the ring filter element is received by the receiving space;
 a ramp disposed at the receiving space bottom configured to guide the pin when the ring filter element is received by the receiving space, the ramp extending circumferentially about the longitudinal axis from the receiving space bottom with a lower end at the opening of the no-load duct and rising axially with increasing ramp length into the interior of the receiving space, wherein the pin engages on the ramp and slides towards the receiving space bottom when the ring filter element is rotated about the longitudinal axis and penetrates the opening of the no-load duct at the lower end of the ramp; and a structure disposed in the receiving space bottom next to the ramp, wherein the structure prevents the ring filter element from being received by the receiving space in an operational state unless the pin engages and slides along the ramp, and wherein the ring filter element is in the operational state when the pin penetrates the opening of the no-load duct at the lower end of the ramp;

wherein the structure includes at least one rib extending in a circumferential direction along the ramp, and wherein the at least one rib is arranged at least on a radial outside of the ramp with respect to the longitudinal axis; and wherein the at least one rib extends in the circumferential direction and includes a radially extending branch rib, and wherein the branch rib is arranged at least one of (i) between the at least one rib and the filter housing, and (ii) between the at least one rib and the ramp.

9. The filter according to claim 8, wherein the least one rib extends in the circumferential direction at least 180° along the ramp.

10. The filter according to claim 8, wherein the at least one other rib extending in the circumferential direction projects beyond the ramp with respect to the bottom of the receiving space.

11. The filter according to claim 8, wherein the at least one rib projects beyond the ramp with respect to the bottom and defines a lateral guide as the pin slides along the ramp.

\* \* \* \* \*